(12) United States Patent
Foucher

(10) Patent No.: US 7,330,719 B2
(45) Date of Patent: Feb. 12, 2008

(54) METHOD FOR USING RADIOTELEPHONE TERMINAL AS REMOTE CONTROL FOR AUTOMATIC DEVICES SUPPLYING FEE-PAYING SERVICES

(75) Inventor: Albert Foucher, Versailles (FR)

(73) Assignee: Soclete Francalse du Radiotelephone, Paris (FR)

( * ) Notice: Subject to any disclaimer, the term of this patent is extended or adjusted under 35 U.S.C. 154(b) by 244 days.

(21) Appl. No.: 10/521,366

(22) PCT Filed: Jul. 11, 2003

(86) PCT No.: PCT/FR03/02213

§ 371 (c)(1),
(2), (4) Date: Aug. 22, 2005

(87) PCT Pub. No.: WO2004/008401

PCT Pub. Date: Jan. 22, 2004

(65) Prior Publication Data

US 2006/0160521 A1    Jul. 20, 2006

(30) Foreign Application Priority Data

Jul. 12, 2002   (FR) ................................. 02 08831

(51) Int. Cl.
*H04M 3/00* (2006.01)
(52) U.S. Cl. ................. 455/420; 455/414.1; 455/552.1
(58) Field of Classification Search ................ 455/420, 455/414.1, 552.1, 418, 419, 456.3
See application file for complete search history.

(56) References Cited

U.S. PATENT DOCUMENTS 5,963,624 A * 10/1999 Pope ..................... 379/110.01
6,360,141 B1   3/2002 Jensen ........................ 700/237
6,757,585 B2 * 6/2004 Ohtsuki et al. ............. 700/237

FOREIGN PATENT DOCUMENTS

| EP | 1 184 818 A1 | 9/2000 |
| EP | 1 096 439 A2 | 5/2001 |
| EP | 1 168 257 A1 | 1/2002 |
| WO | WO 99/22346 | 5/1999 |
| WO | WO 01/45058 A1 | 6/2001 |

* cited by examiner

*Primary Examiner*—Temica Beamer
(74) *Attorney, Agent, or Firm*—Perman & Green, LLP

(57) ABSTRACT

The invention concerns a method providing a user with the use of a radiotelephone terminal for remotely controlling automatic devices supplying fee-paying services. In particular, the invention concerns a method including a call by the user to a central server, the user dialing, using his terminal, a control number, storing the control number and the identification number of the terminal in a storage unit of the central server, followed by the central server freeing the line without disconnection, verifying the identification of the device at least based on the control number, verifying the user's rights, then, in case of authorization for the user to use his terminal for remotely controlling a device. The method further includes transmission by the central server to the device a command for a specific operation, and execution of the operation by the device.

18 Claims, 2 Drawing Sheets

Figure 1:
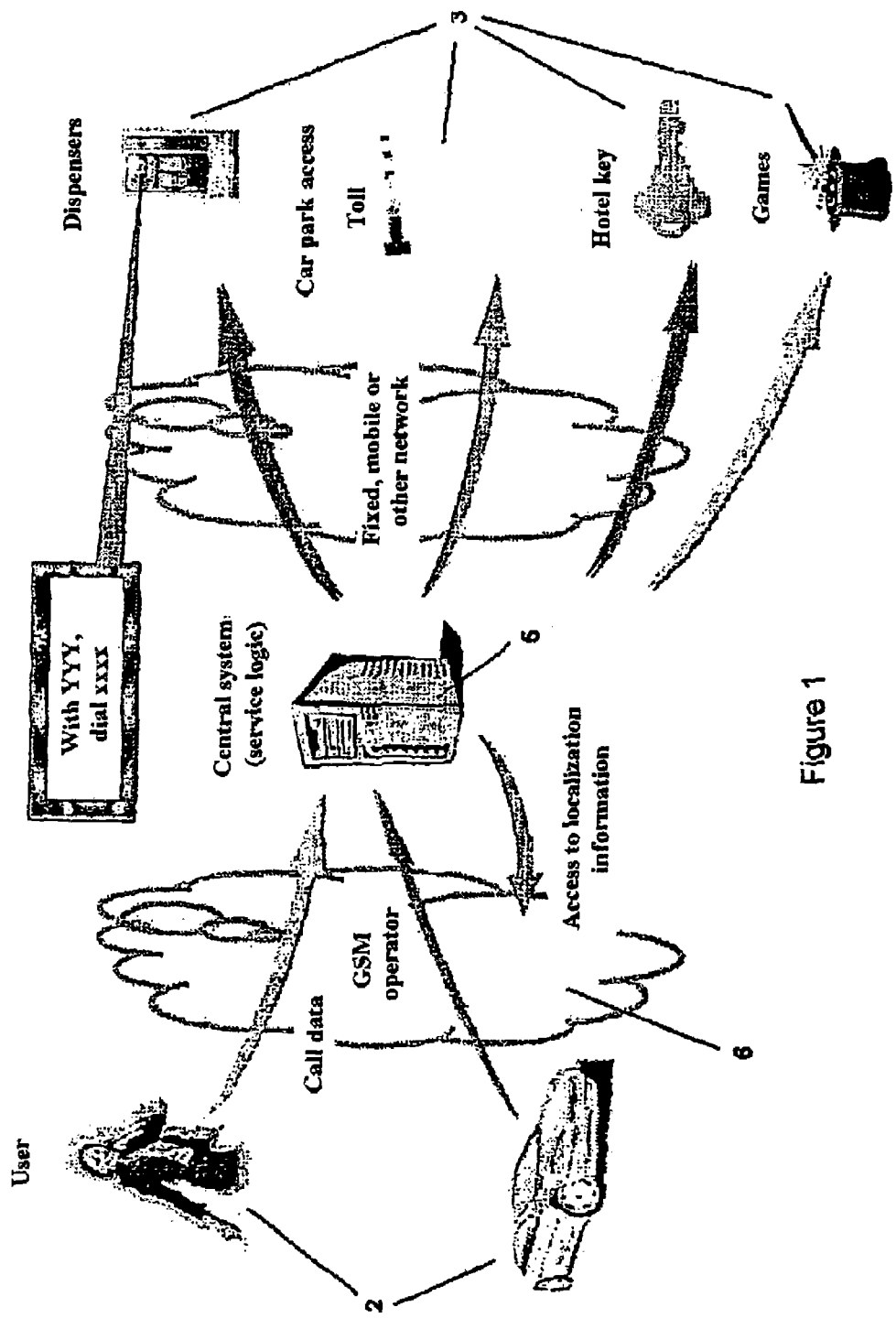

METHOD FOR USING RADIOTELEPHONE TERMINAL AS REMOTE CONTROL FOR AUTOMATIC DEVICES SUPPLYING FEE-PAYING SERVICES

This application is the National Stage of International Application No. PCT/FR2003/002213, International Filing Date, Jul. 11, 2003, which designated the United States of America, and which international application was published under PCT Article 21(2) as WO Publication No. WO 2004/008401 A2 and which claims priority from French Application No. 02/08831, filed Jul. 12, 2002.

The present invention relates to a method allowing a user to use a radiotelephone terminal as a remote control for automatic devices providing pay services. The invention is particularly useful for example for remotely controlling food or drink automatic dispensers, or even for accessing car parks or hotel rooms with automatic payment.

The automatic devices as those mentioned above, generally operate by cash or bank card payment, and more recently with a card containing an electronic purse. A drawback of these cash payment devices is that the user is forced to have plastic money to meet his/her need for consuming or service.

The controlling of automatic devices by radiotelephone terminals via voice or data transmitted via graphic (WAP) or text (SMS) interfaces. A drawback of controls via voice is that the dialog is not always easy, as it depends on the surrounding noise. Another drawback of controls via voice is that action is not immediate, as the listening of messages by the voice central server and the activation of the control command by said server, involve a long path in the tree structure. A drawback of controls via graphic interfaces is that the dialog between a terminal and the central server may be long and difficult, taking into account the volume of data to be transmitted and the present size of terminal screens, respectively. A drawback of controls via text is that inputting the message is tedious, as a single key of a terminal comprises three letters to be scrolled for selecting the one desired. Another drawback of controls via text is that the network load is not insignificant. A further drawback, common to the previous types of control by a terminal is the large cost as the user of the service pays for both the service and the radiotelephone call.

The object of the present invention is to abolish certain drawbacks of the prior art by proposing a method for using a radiotelephone terminal as a remote control for automatic devices, which is fast and inexpensive.

This object is achieved by a method for allowing a user to use a radiotelephone terminal as a remote control for an automatic device providing one or more pay services, characterized in that it comprises a calling step from the user to a central server, through the radiotelephone network, the user dialing with the help of his/her terminal, a control number, a step for identifying and storing the control number and the identification number of the terminal in a memory of the central server, followed by a step during which the central server hangs up without having opened the line, a step for identifying the device at least from the control number, and a step for investigating and checking the rights of the user, then, if the user is authorized to use his/her terminal for remotely controlling a device, the method also comprises a step for transmitting by the central server to the device, a command for a determined operation and a step for executing the operation with the device.

According to another feature, the control number is indicated to the user who wants to use his/her radiotelephone terminal as a remote control for an automatic device, by a first interface of the device orally.

According to another feature, the control number is indicated to the user who wants to use his/her radiotelephone terminal as a remote control for an automatic device, by a written message on a first interface of the device.

According to another feature, this step for identifying the device consists of consulting by the central server a look-up table between the control numbers, and the types of devices, each device being unambiguously identified by a control number, and extracting the type of device from the look-up table from the control number received by the central server.

According to another feature, the step for identifying the device consists of a step for querying the operator by the central server in order to know the geographical localization of the user, i.e., and the area covered, defined by the base ground station(s) in the vicinity of which the user and device are found, followed by a step for sending a message from the operator to the central server indicating the geographical localization of the device, and a step for consulting by the central server, a look-up table between the control numbers, the devices, and the geographical localization of the devices, each device being unambiguously identified by a control number and a geographical localization, and for extracting the type of the device from the look-up table, from the control number received by the central server.

According to another feature, the step for investigating and checking the rights of the user, consists of consulting, by the central server, a list of registered users, this list comprising identification numbers, notably MSISDN numbers, of users authorized to use their radiotelephone terminal as a remote control for one or more determined automatic devices, and comparing the received identification and control numbers with the list of the registered users.

According to another feature, if the user is not authorized to use his/her radiotelephone terminal as a remote control for the device, the central server establishes a radiotelephone communication with the user and notifies him/her that he/she is not authorized to use his/her radiotelephone terminal as a remote control for the device.

According to another feature, the step for transmitting by the central server to the device, a command for a determined operation, consists of sending an execution command message by the central server to the device, through the radiotelephone network or the wired network, to order the device to execute the operation and receiving the execution command message by a radiotelephone communications module of the device.

According to another feature, the device executes the operation by means of a control module.

According to another feature, if the device proposes a single service, executing the operation by the device consists in the device providing said service to the user.

According to another feature, if the device proposes several services, a different control number is associated to each service; executing the operation by the device consists in the device providing the user with the service associated with the control number dialed by the user.

According to another feature, if the device proposes several services, a unique control number is associated to the device, executing the operation by the device consists in the device enabling a second tactile interface so that the user selects a service, and the device providing the service selected by the user.

According to another feature, if the device has provided the desired service to the user, the step for executing the operation by the device is followed by a step for storing the service provided by the device in an included memory of the device, and a step for billing the service by the radiotelephone operator via the central server and the device.

According to another feature, the billing step consists of sending a message of successful execution of the device's operation, via its communications module, to the central server, the message of successful execution of the operation comprising at least one identifier of the device, the performed service, the cost of the service and the time at which the service was provided.

According to another feature, the message of successful execution of the operation is stored in the memory of the central server and associated by the central server with the identification number of the terminal of the user, the central server then sending to the operator, a service billing message to the user, the billing message comprising at least the identification number of the terminal of the user and the price that the latter should pay.

According to another feature, the operator stores the billing message in a memory of the server of the operator.

According to another feature, if the device has not provided the desired service to the user, the device uses its first interface to inform the user that an error has occurred, and sends an error message to the central server, the error message comprising at least an identifier of the device, the service which was desired, and the time at which the error occurs.

According to another feature, the central server stores the error message in its memory and sends an information message to the user through the radiotelephone network to inform him/her that an error occurred.

Figure 2:
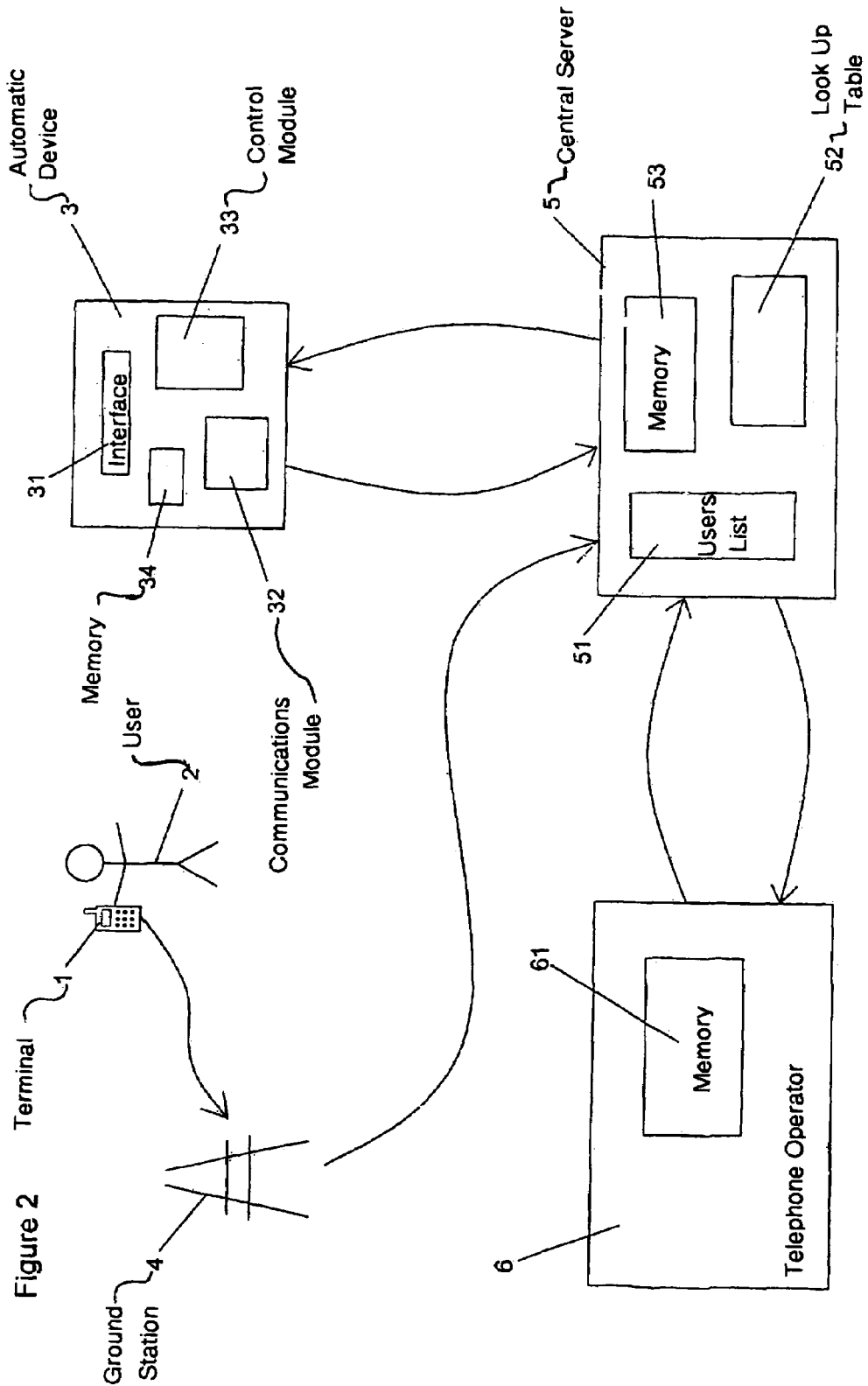

Other features and advantages of the present invention will become more apparent upon reading the description hereafter, made with reference to the appended drawings, wherein:

FIGS. 1 and 2 illustrate a block diagram of the method according to the invention;

In FIG. 2, a user (2) provided with a radiotelephone terminal (1) is standing in front of an automatic device (3) which he/she wishes to remotely control with his/her terminal (1). The automatic device (3) comprises at least an oral or written communications interface (31) with the user (2) and a computer system including a memory (34). This interface (31) displays or orally tells him/her to firstly contact a central server (5) by dialing a number, a so-called control number, in order to remotely control the device (3). For example, the greeting transmitted by the interface (31) of a drink dispenser (3) may be: "To get your drink through operator YYY, dial XXXX!". This control number should be both as short as possible so that the user (2) may access the desired service as quickly as possible, and sufficiently long so that a sufficient number of automatic devices (3) may be used by the method according to the invention. The number of digits composing the control number is preferably four, but it may be between one and ten. With globalization of the whole, the size of the control numbers may be reduced significantly, effectively and advantageously.

If the automatic device (3) proposes several services, several control numbers may be assigned to said device (3), each number allowing execution of only one of the services. For example, for a drink dispenser delivering several different products, a different control number is associated with each of the products proposed by the dispenser. In this embodiment with a device proposing several services, the device (3) comprises one interface (31) per available service. These different interfaces (31) are equally oral or written interfaces if they become active after the user (2) has pressed on a button corresponding to the selected service, and preferably written if they are all active at the same time, in order to avoid any confusion.

To benefit from the method according to the invention, the user (2) having a radiotelephone terminal (1) should have registered beforehand at the telephone operator (6) proposing the method according to the invention.

When the user (2) dials the suitable control number on his/her radiotelephone terminal (1), the call is transmitted through the radiotelephone network, for example the GSM network, towards the nearest base ground station (4) to said terminal (1). The call is then transmitted through the wired network from the nearest base ground station to the terminal (1), towards one or several central servers (5). The radiotelephone operator (6) managing the method may geographically distribute several central servers (5), each central server (5) only answering calls from a determined geographical area.

To simplify the description, the remainder of the method will be described by only considering a single central server (5). The central server comprises at least a computer system including a memory (53). When the central server (5) receives the call from the terminal (1), the owner of which wishes to remotely control an automatic device (3), the central server (5) records the identification number of the terminal (1), for example the MSISDN number and the control number in its memory (53) and hangs up without having opened the line. This allows the user (2) not to pay for any telephone call, which makes the method according to the invention inexpensive with regard to the prior art method described above and moreover extremely fast.

The central server (5) also comprises a list of users authorized to benefit from the method according to the invention, which have registered beforehand at the operator (6). This list, the so-called registered users' list (51), associates the identification number of each user with the service to which the user has subscribed, i.e., the types of devices which he wishes to control remotely. It may be foreseen that certain users are only registered for certain types of devices. The central server (5) also comprises a table associating the different control numbers with different devices (3), the so-called look-up table (52). After the central server (5) has recorded the control number and the identification number of the terminal (1), it consults the look-up table (52) in order to identify the device (3) from the control number, and the list of registered users (51) to find out about the rights of the user from the identification number. If the user (2) is not authorized to remotely control the device (3) in front of which he/she is standing, the central server (5) establishes a communication with the radiotelephone terminal (1) of the user, then, for example, sends a message as a text to said user or contacts him/her orally, through the radiotelephone network, to inform him/her that he/she is not authorized to control this device (3) remotely. In an alternative embodiment of the invention, the central server (5) sends the message to the device (3) so that the latter informs the user (2) via its interface (31), that he/she is not authorized to control this device remotely. If, on the other hand, the user (2) is authorized to remotely control the device (3) in front of which he/she is standing, the central server (5) sends to the relevant device (3), a message, a so-called execution command message, so that the device (3) executes the operation desired by the user (2). This message is sent by the communications means selected by the user: dedicated line, fixed line, GSM, GPRS, SMS, R-LAN (Bluetooth or Wi-fi type, notably 802.11) lines, etc.

In an alternative embodiment of the present invention, implementing a geodependence of the device, the look-up table (52) also associates with each control number/device type pair (3), the geographical localization of the user (2) in a defined area. With this, the same control number may be advantageously assigned to several devices each located near a different defined area. Localization of the user may be carried out by the network according to different methods (base station, cell in the base station, computation of position according to waves received by the terminal, etc. . . . ). In this alternative, the central server (5), after having recorded the identification and control numbers in its memory (53), queries the radiotelephone operator (6) by means of its service logic, in order to know in what area the user (2) is to be found and in what area the device (3) is to be found. This information is available by applying methods associated with the radiotelephone network which provides said information. By matching both pieces of information, the requested service may be executed. The operator (6) comprises a computer system which searches for the geographical localization information in a memory (61) in which are recorded calls transiting through the different base ground stations (4). The operator (6) then transmits the geographical localization information to the central server (5) which records it in its memory (53). The central server (5) then consults the look-up table (52) in order to identify the device (3) according to the control number received from the user (2) and to the geographical localization of the device received from the operator (6). The rest of the procedure, i.e., the checking of the user's rights and the sending of an execution command message from the central server (5) to the relevant device (3), is the same.

In another alternative, the central server (5) simultaneously manages devices with geodependent control numbers and devices with non-geodependent control numbers. If the central server (5) extracts from the look-up table (52), several devices corresponding to a same control number, the central server (5) queries the operator to have access to the geographical localization of the device (3) as described above, then checks the user's rights and sends the execution command message to the device. If the central server (5) extracts from the look-up table (52) a single device corresponding to a determined control number, the central server (5) checks the user's rights without querying the operator about the geographical localization of the device, and then sends the execution command message to the device. This alternative allows a user to ignore distance for certain operations which he/she will be able to trigger regardless of the location where he/she is standing, as for example automatically switching on the heating of his/her second home with his/her mobile phone, for example two hours before his/her arrival. However, this second alternative has a drawback which is the loss of the notion of proximity. Indeed, as the user is not present in front of the device delivering the desired service, he/she cannot check whether he/she has dialed the proper control number, and that he/she has not triggered another device erroneously.

The device (3) comprises at least a communications module (32) communicating with an electronic control module (33) on the one hand, and on the other hand with the central server (5) either through the radiotelephone network, or through the wired network, and a computer system including a memory (34). If the communications module (32) communicates with the central server through the GSM network, the communications module (32) has a SIM card. The communications module (32) receives the execution command message which it receives from the central server and transmits the command to the control module (33) which executes the operation. In the case of a device (3) proposing a single service, execution of the operation by the control module (33) consists in providing the user (2) with said service. Examples of possible services are given later on.

In the case of a device (3) proposing several services, if a single control number is assigned to the device (3), execution of the operation by the control module (33) consists in making the different available services accessible to the user (2). The user (2) then selects for example through a system of keys designating the available services, the one which he/she desires, and the device provides him/her with this service. If, on the other hand, several control numbers are assigned to the device (3), each control number being associated with a unique service, execution of the operation by the control module (33) consists of providing the user (2) with the service corresponding to the dialed control number.

Immediately after the user (2) has had the desired service, the device (3) sends to the central server (5), through the communications module (32), an execution message of successful operation comprising at least an identifier of the device (3), the provided service, the cost of the service and the time at which execution occurred, or an error message if the service could not be provided. The error message comprises an identifier of the device (3), the service which should have been performed, the reporting of the error and time at which the error occurred. The execution messages of successful operation and the error messages are recorded in the memory (34) of the dispenser (3). In an alternative embodiment of the invention, the device (3) sends the execution messages of successful operation and the error messages in packets of several messages, after several executions have been performed for different users (2), which followed for remotely controlling said device (3). The successful execution or error messages are sent through the wired network or through the radiotelephone network for example by means of "texting" ("SMS"), or in GPRS mode.

The central server (5) receives the successful execution and/or error messages and stores them in its memory (53). The central server (5) then associates each received message with the identification number of the user, for example by means of the time at which execution occurred or the time at which the error occurred, these times only being slightly later than the time at which the central server (5) transmitted the execution command message to the device (3). In the case of success, the central server (5) then sends a billing message to the operator (6), through the wired or radiotelephone network. This billing message is only sent if execution occurred. It comprises the identification number of the user (5) and the price to be billed.

If an error occurs and an execution cannot occur, the device (3) displays or orally states, via its interface (31), that there is an error, and specifies what this error is (for example: "this service is no longer available"). The central server (5), after receiving an error message from the device (3) may also inform the user via his/her terminal (1) by sending him/her, for example, a message in text form (SMS) or by contacting him/her orally. In an alternative embodiment, it may also inform the entity operating the device (3) in order to report an anomaly.

Note that the user may be subscribed to another operator which has roaming agreements with the operator (6). In this case, the operator (6) which manages the method according to the invention sends billing to the operator with which the user (2) of the method has a subscription and this, according to the roaming agreements.

Also note that the central server (5) and the operator (6) periodically communicate with each other for updating the list of registered users (51) and the look-up table (52).

The method according to the invention may find application in a multitude of fields, from which certain non-limiting examples are listed below:

in electronic commerce, for:
- accessing public car parks (this device is detailed later on),
- pay parking with a system of ticket machines (this device is detailed later on),
- toll gates,
- renewal of orders,
- settlement of invoices,
- electronic identification and signature,
- emergency call,
- hotel service; arrival, departure, room key, room service, etc. . . .
- fast-food: automatic dispensers (this device is detailed later on).

in control and remote monitoring, for:
- lighting, signal, parking controls,
- display controls,
- wireless safety items, remote controls: heating, electricity, etc. . . . ,
- home automation,
- surveillance,
- alarms: water, fuel tanks, etc. . . . ,
- stockout: automatic systems,
- fleet management: diagnosis, tracking, etc. . . . ,
- equipment: irrigation, power supplies, environmental control, etc. . . .

in associations, for:
- sports: forecasts, betting, etc. . . . ,
- games: votes, selections, etc. . . .
- clubs: registration, booking, etc. . . .

Let us recall that the system for applying the method, in order to operate, should contain the list of clients for the services, these clients may be all or a part of the clients of the operator managing the method, as well as external clients, which have registered for the services beforehand, this list being absolutely necessary for identifying the users and possibly for charging them with the costs of the service. This system should also contain rights associated with each client, a dialing system which identifies the remotely controlled device, possibly the access to the geographical localization of the user's terminal, and one or several central servers.

The next paragraphs detail the application of the method according to the invention to the example of an automatic drink dispenser.

A consumer (2) is in front of an automatic drink dispenser. The dispenser comprises, instead of the conventional coin tester, a "black box" detailed later on. The consumer (2) can read on the front of the dispenser, a message prompting him/her to use his/her terminal (1) to have a drink. The consumer (2) who wishes to have a drink, dials the control number which is displayed on the dispenser. His/her call is automatically routed to the central server (5) which receives the call, analyzes the call data (the user's identification number and the control number), but does not open the line.

By recognizing the dialed control number, the central system (5) by its service logic, queries the radiotelephone network in order to find the geographical position of the mobile phone. With the localization information, the central system (5) associates, through the look-up table (52), the dialed control number with the dispenser (3) located in the area near the consumer (2). The central server (5) checks the user's rights in the list of registered users (51).

The central system (5) sends a command to the automatic dispenser (3) via a communications network (which, as the case may be, is the fixed network, a specialized line, the GSM network, a wireless network, etc. . . . ).

The black box of the dispenser (3) comprises a communications module (32) for example a GSM or GPRS module, with a SIM card, which communicates with an electronic control module (33) on the one hand and on the other hand with the central server (5). The communications module (32) receives an operation execution command from the server and transmits it to the control module (33) which then actuates a contact switch which, according to the solution selected by the operator, triggers off either the key for selecting the dispenser's items or the designated item (if it is unique). The user/consumer (2) may thus consume a drink. This drink will be recorded in the memory (34) of the dispenser (3) and referenced by the control of the central system (5).

The dispenser (3) (either immediately or off-line) informs the central system (5) about the items of the transaction (machine, product, price, etc. . . . ) or possibly about an anomaly.

The central server (5) records the amount of the transaction and associates it with the identification number of the consumer (2). The central system (5) informs the operator (6) of the consumer (2) on the amount of the transaction. Malfunction cases are analyzed and processed by the central system (5). The central system (5) is in contact with the computer system of the operator (6) for carrying over consumptions and possibly with the computer system of the dispenser (3) for feeding back consumption items, inventory management items, anomalies, and updates of the dispenser (for example price changes).

The central system (5) may consider administration of consumers (2) for loyalty, incentive and barging purposes both from the operator point of view and from that of the dispenser.

The following paragraphs detail the application of the method according to the invention to the example of accessing a car park.

Application of the method to car park access works on the same principles. The user (2) who wishes to access a car park, dials a control number which is displayed near the access barrier. The call is processed by a central system (5), which checks the consumer's rights and his/her localization (if this function is implemented). After having matched the localization of the mobile phone and the access barrier, the central system (5) retransmits an open command (through a link, either a radiotelephone or wired link). The system (3) which controls the access barrier, makes sure that a vehicle is actually present in front of the access, for example by a presence loop in the ground, and controls the opening of the barrier.

The user's (2) right of access may be an owned right (it is the customary user who is requesting access) or may be delegated (in this case, it is a usually authorized person who gives the right of access) to another user (for example, a visitor identified by his/her identification number: the latter is recorded during a defined period of time, for accessing the car park).

Malfunction cases are analyzed and processed by the central system (5).

Finally, the central system (5) may be in contact with a billing system and may handle the user (2) with follow-up of consumption and loyalty as previously.

In a corporate car park, for example, each user may have the possibility of giving a right of access to a visitor, for example for half a day. The visitor must then book beforehand by phoning the operator (6) or by sending him/her a message for specifying the desired half-day and the identification number. A message is then sent to the visitor in order to specifically inform him/her of the number of the booked parking space. When the user arrives near the barrier and dials the control number, he/she is identified by the central server by his/her identification number. Access of the visitor to the car park is authorized, either in the space of the customary user, or in a group of spaces reserved to the visitors, depending on their availability.

The following paragraphs detail the application of the method according to the invention to the example of pay parking.

To benefit from this service, the motorist (2) dials the control number initially indicated on a ticket machine terminal (3) upon parking his/her vehicle. The central server (5) identifies the ticket machine (3) and checks the user's rights, then:

either enables the ticket machine (3) so that the latter prompts the motorist (2) to select a parking time. After selection of the time by the motorist, the ticket machine edits a ticket which the motorist sets behind the windscreen of his/her vehicle. The ticket machine (3) then informs the central server (5) of the price that the motorist must pay (2) which depends on the selected parking time, or records the time when parking begins in a memory of the central server. When his/her parking time ends, the motorist must dial a second control number so that the central server may record the time when parking ended. The central server comprises a table associating the identification number and the license number or a bar code affixed on the vehicle. The motorist must then display on his/her vehicle that he is in possession of the remote control pay service. Car park wardens check whether the parking is lawful by means of a specific mobile phone which communicates with the central server, and by reading a bar code affixed on the vehicle. A central system (5) controls and manages the parking of vehicles.

It should be apparent to those skilled in the art that the present invention allows embodiments under many other specific forms without departing from the field of application of the invention as claimed. Consequently, the present embodiments should be considered as an illustration, but they may be altered within the field defined by the scope of the appended claims, and the invention should not be limited to the details given above.

The invention claimed is:

1. A method for allowing a user (2) to use a radiotelephone terminal (1) as a remote control for an automatic device (3) providing one or more pay services, characterized in that it comprises:

a calling step from the user (2) to at least one central server (5), through the radiotelephone network, the user (2) dialling a control number with the help of his/her terminal (1), a step for receiving the call without opening the line by the central server(s) (5), by using identification means and a memory (53) of the central server (5), in order to respectively identify and store the control number and the identification number of the terminal, followed by an end-of-communications step using means for hanging up without opening the line allowing the central server(s) (5) to hang up without having opened the line, a step for identifying the device (3) at least from the control number, a step for investigating and checking the rights of the user (2), then, if the user is authorized to use his/her terminal (1) for remotely controlling a device (3), a step for transmitting by the central server(s) (5) to the device (3), a command for a determined operation, and a step for executing the operation by the device (3).

2. The method according to claim 1, characterized in that the control number is indicated to the user who wants to use his/her radiotelephone terminal (1) as a remote control for an automatic device (3), by a first interface (31) of the device (3) orally.

3. The method according to claim 1, characterized in that, the control number is indicated to the user who wants to use his/her radiotelephone terminal (1) as a remote control for an automatic device (3), by a message written on a first interface (31) of the device (3).

4. The method according to claim 1, characterized in that the step for identifying the device (3) consists of consulting, by the central server (5), a look-up table (52) between the control numbers and the types of devices (3), each device being unambiguously identified by a control number, and extracting the device (3) type from the look-up table (52), from the control number received by the central server (5).

5. The method according to claim 1, characterized in that the step for identifying the device (3) consists of a step for querying the operator (6) by the central server (5) to be informed on the geographical localization of the user (2), i.e., a defined area covered by the base ground station(s) (4) near which the user (2) and the device (3) are found, followed by a step for consulting, by the central server (5), a look-up table (52) between the control numbers, the devices (3) and the geographical localization of the device (3), the device being unambiguously identified by a control number and a geographical localization, and extracting the device (3) type from the look-up table (52), from the control number received by the central server (5).

6. The method according to claim 4, characterized in that the step for investigating and checking the rights of the user (2) consists of consulting, by the central server (5), a list of registered users (51), this list comprising identification numbers, notably the numbers of users (2) authorized to use their radiotelephone terminal (1) as a remote control for one or several determined automatic devices, and comparing the identification and control numbers received with the list of registered users.

7. The method according to claim 6, characterized in that, if the user is not authorized to use his/her radiotelephone terminal (1) as a remote control for the device (3), the central server (5) establishes a radiotelephone communication with the user (2) and notifies him/her that he/she is not authorized to use his/her radiotelephone terminal (1) as a remote control for the device (3).

8. The method according to claim 1, characterized in that the step for transmitting by the central server (5) to the device (3), a command for a determined operation, consists in sending an execution command message, through the radiotelephone network or through the wired network, in order to order the device (3) to execute the operation and in receiving the execution command message by a radiotelephone communications module (32) of the device (3).

9. The method according to claim 1, characterized in that the device (3) executes the operation by means of a control module (33).

10. The method according to claim 9, characterized in that, if the device (3) proposes a single service, execution of the operation by the device (3) consists of the device (3) providing said service to the user (2).

11. The method according to claim 9, characterized in that, if the device (3) proposes several services, a different control number being associated with each service, execution of the operation by the device (3) consists of the device (3) providing to the user (2) the service associated with the control number dialed by the user (2).

12. The method according to claim 9, characterized in that, if the device (3) proposes several services, a unique control number being associated with the device (3), execution of the operation by the device (3) consists of the device (3) enabling a second tactile interface of the device (3) so that the user selects a service, and in that the device (3) provides the service selected by the user (2).

13. The method according to claim 1, characterized in that, if the device (3) has provided the desired service to the user (2), this step for executing the operation by the device (3) is followed by a step for storing the service provided by the device (3) in a memory (34) of the device (3), and by a step for billing the service by the radiotelephone operator (6) via the central server (5) and the device (3).

14. The method according to claim 13, characterized in that, the billing step consists in sending a successful operation execution message from the device (3), via its communications module (32), to the central server (5), the successful operation execution message comprising at least an identifier of the device (3), the performed service, the price of the service and the time at which the service was provided.

15. The method according to claim 14, characterized in that the successful operation execution message is stored in the memory (53) of the central server (5) and associated by the central server (5) with the identification number of the terminal (1) of the user (2), the central server (5) then sending to the operator (6), a message for billing the service to the user (2), the billing message comprising at least the identification number of the terminal of the user (2) and the price that the latter should pay.

16. The method according to claim 15, characterized in that the operator (6) stores the billing message in a memory (61) of the server of the operator (6).

17. The method according to claim 1, characterized in that, if the device (3) has not provided the desired service to the user (2), the device (3) uses its first interface (31) to inform the user (2) that an error occurred, and sends an error message to the central server (5), the error message comprising at least an identifier of the device (3), the service which was desired, and the time at which the error occurred.

18. The method according to claim 17, characterized in that, the central server (5) stores the error message in its memory (53) and sends an information message to the user (2) through the radiotelephone network to inform him/her that an error occurred.

* * * * *